Figure 1:
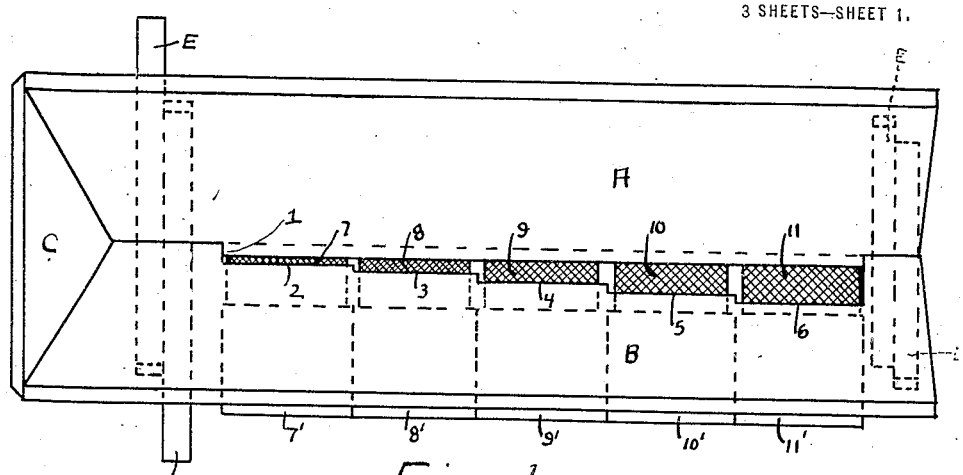

E. R. SCOTT.
APPLE GRADER.
APPLICATION FILED JUNE 12, 1919. RENEWED NOV. 22, 1920.

1,363,818.

Patented Dec. 28, 1920.

3 SHEETS—SHEET 1.

Evan R. Scott INVENTOR.

BY

William E. Baff ATTORNEY.

E. R. SCOTT.
APPLE GRADER.
APPLICATION FILED JUNE 12, 1919. RENEWED NOV. 22, 1920.
1,363,818.
Patented Dec. 28, 1920.
3 SHEETS—SHEET 2.
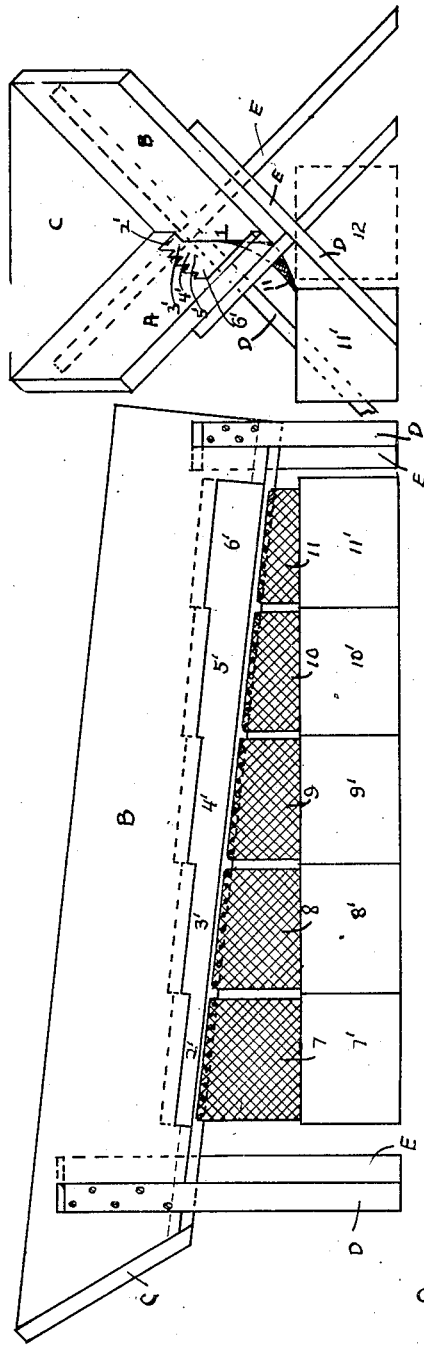
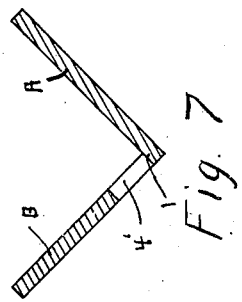
Evan R. Scott INVENTOR.
BY
William E. Baff. ATTORNEY.

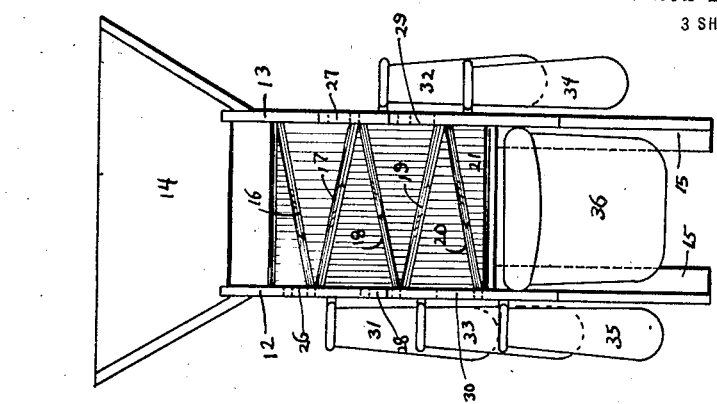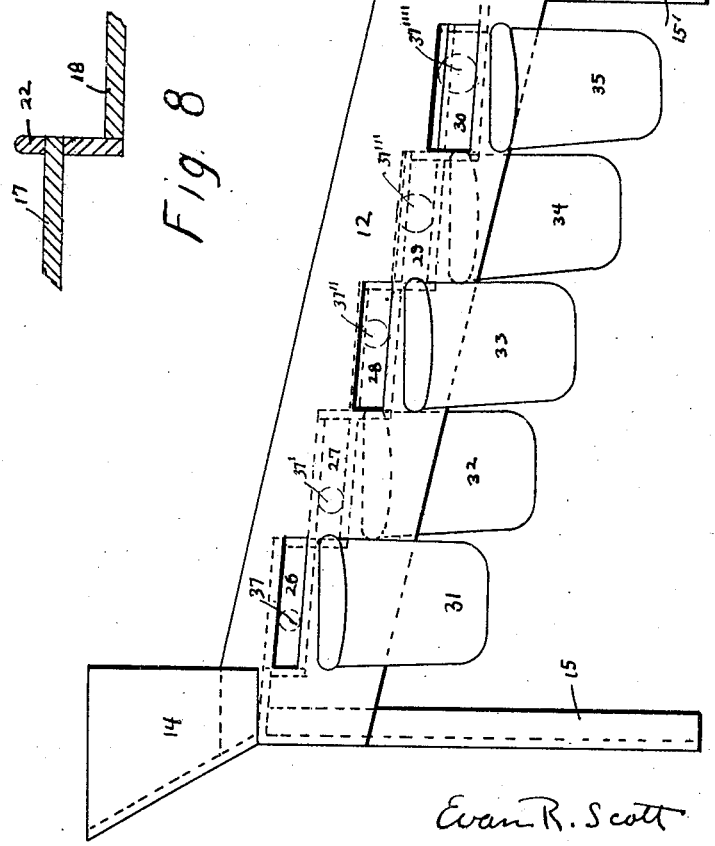

UNITED STATES PATENT OFFICE.

EVAN R. SCOTT, OF WORCESTER, MASSACHUSETTS.

APPLE-GRADER.

1,363,818.  Specification of Letters Patent.  Patented Dec. 28, 1920.

Application filed June 12, 1919, Serial No. 303,740. Renewed November 22, 1920. Serial No. 425,908.

*To all whom it may concern:*

Be it known that I, EVAN R. SCOTT, a citizen of the United States of America, and resident of the city of Worcester, in the county of Worcester and State of Massachusetts, have invented new and useful Improvements in Apple-Graders, of which the following is a specification.

This invention relates to improvements in apple grading devices and has for its object to provide a simple, highly efficient and inexpensive arrangement designed to direct units of fruit of varying sizes such as apples, oranges, etc., into appropriate receptacles, such that those units of fruit which are of the same size will be collected automatically into separate receptacles from those which are of a larger size, and the latter will be collected in special receptacles provided for this purpose. In this manner the fruit will be properly graded in a very simple manner.

A further object of my invention consists in the provision of a device of the above character in which the desirable characteristics of reliability and efficiency are obtained in that a fruit grader is devised permitting a continuous load of units of fruit to roll down a chute and to automatically be directed into appropriate receptacles, according to the sizes of these units.

A still further object of my invention is to provide an arrangement wherein there is combined the feature of novelty as regards shunting the direction of movement of fruit rolling down an incline, and the element of convenience in so far as there are provided means for piling up units of fruit of determinate sizes in receptacles made to receive only such sizes, etc.

With the above and other objects in view my invention consists in the combination, arrangement, and details of construction disclosed in the drawings and specification, and then more particularly pointed out in the appended claims.

Figure 4:
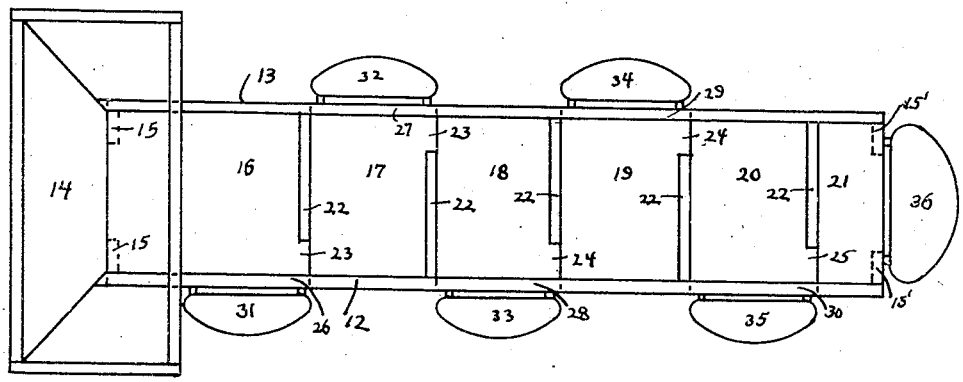

In the drawings wherein similar reference characters designate similar parts throughout the respective views, Figure 1 is a top plan view of one preferred form of my invention, Fig. 2 is a side elevation thereof, Fig. 3 is an end elevation thereof, Fig. 4 is a top plan view of another and modified form of my invention, Fig. 5 is a side elevation of Fig. 4, Fig. 6 is an end elevation of Fig. 4, Fig. 7 is a cross-section of the chute of Fig. 2, and Fig. 8 is a fragmental sectional detail view of a buffer to be further described.

Referring to the drawings which are merely illustrative of my invention A and B designate opposing inclined walls of a chute the upper end wall C of which inclines upwardly as shown in Fig. 2 and serves to provide a hopper for feeding units of fruit such as apples, oranges, etc., into said chute. The upper portion of this chute is supported upon the posts D, E, while the lower end thereof is secured upon the shorter posts D, E, in this way it will be seen that this chute is inclined longitudinally from high at its upper portion to low at its lower portion. The chute thus formed will feed the units of fruit downwardly so as to impart a rolling movement thereto. The side wall B of the chute is cut away longitudinally while the side wall A is provided with a longitudinal projection 1 adapted to fit the longitudinal opening of wall B. The arrangement of this chute is such that the edges of the longitudinal opening of wall B are stepped at various points longitudinally of the chute, this providing a consecutive series of gradually deepened or enlarged openings designated 2', 3', 4', 5', and 6' respectively, the several openings gradually becoming deeper as the lower end of the incline of the chute is reached as clearly shown in Fig. 2. It will thus be seen that the edges 2, 3, 4, 5, and 6 of the several openings 2', 3', 4', 5', and 6' form restraining portions against the entrance into said openings of units of fruit of a size not adapted to freely enter said openings. Thus the user of this device may drop a load of fruit such as apples consisting of units of varying sizes into the hopper or hopper-forming portion C, cause the same to automatically roll down the incline of the chute from high to low. It is proposed now to shunt the course or path of movement of these units of fruit rolling down the incline so that they may be directed transversely of the chute in the direction of these several openings so as to project therethrough. In the device shown in Fig. 1 guiding members are provided for this purpose and consist of the opposing side walls A and B which also incline in a transverse plane at right angles to the axis of the chute as shown in Fig. 3. Therefore at the same time that the apples or other fruit roll down the incline of the chute longitudinally they will slide or roll down the wall B of the chute in the direction of the wall A or toward the openings in this wall A, so that apples or other fruit large enough to pass through the first opening 2' will drop therethrough into the receptacle or box 7'; the next larger size of apple will similarly drop through the opening 3' into the receptacle 8', etc., with respect to the other sizes of apples, etc., intended to be graded in size and deposited into its appropriate receptacle. The units of fruit such as apples, etc., will roll upon the relatively soft cloth guard or supports 7, 8, 9, 10, and 11 which are suitably secured at one end to the edge of the piece 1 of the side wall A, and each is further secured at its opposite end to the upper edge of the receptacles, thereby providing inclined portions conducting the fruit falling thereupon directly to a final receptacle 12. The sizes of apples, etc., not accommodated with special receptacles will all be collected in the end receptacle arranged as indicated by the numeral 12. In this form of construction of apple grader, as fast as the apples, etc., are placed into the chute or hopper they will begin to roll down the same and be graded as already described.

In the form of my invention disclosed in Figs. 4, 5, 6 and 8 the opposing side walls 12 and 13 of the chute do not incline in opposite directions but may be parallel as shown. The hopper 14 in this case forms a part complete in itself and is here also shown arranged at the highest point of the device. The side wall 12 is formed with a series of longitudinally spaced apart slots 26, 28, and 30 respectively which are disposed in a horizontal plane, while the other side wall 13 is similarly formed with the slots or openings 27 and 29 arranged in staggered relation with respect to the first set of openings. The bags 31, 33, and 35 are suitably suspended upon the side wall 12 so that their entrance mouths will be rigidly held open as by means of hoops (not shown) thereby permitting the units of fruit to readily enter these bags and be collected therein. The bags 32 and 34 are similarly secured upon the side wall 13 of the chute.

In this construction guide members are also provided for shunting the longitudinal movement of the apples, etc., in a transverse direction toward the respective openings. This arrangement may take the form of a consecutive series of longitudinally extending inclined boards inclining *seriatim* and alternately in opposing directions. These boards 16, 17, 18, 19 and 20 are so arranged that the apples rolling down upon the board 16 from the hopper 14 will slide or roll on an incline directed toward the opening 26, accommodating one size of apples which will roll into the bag 31; larger sizes of apples may freely pass along through the channel 23 formed by placing a transverse buffer 22 between boards 16 and 17, and terminating the edge of this buffer away from the side wall 12; some of the apples thus unable to pass through opening 26 will keep on rolling and those large enough to pass through the opening 27 on side wall 13 will roll down the incline of board 17 in an opposite direction to that taken by the previous apples.

The posts 15 at the rear of the device hold the hopper higher up than the posts 15', shorter than posts 15 do, thereby causing the chute to incline downwardly longitudinally. These apples will thus pass through the slot 27 and drop into bag 32. Similarly determinate sizes of apples gradually increasing in size such as indicated 37', 37'', 37''', and 37'''' will be adapted to roll down the incline of the chute and severally be shunted toward the right and left transversely of the chute, the boards 18, 19 and 20 conducing to effect this, and the channels 23, 24, and 25 allowing for such a guided movement on the part of the apples, etc. The buffers 22 form guide walls for assuring that the inclines of the boards will direct the apples into the proper bags through the proper openings. Ultimately the apples not passing through these openings will be deposited and collected in the end bag 36. This arrangement of alternately oppositely inclining boards is clearly shown in Fig. 6, and if desired the cloth guide supports 11 shown in Fig. 3 may be utilized in this construction also for the purpose of breaking the impact of the falling apples and preventing impairing the same.

It will be seen that whichever form of chute is used for the purpose of accomplishing the purposes of my invention the apples or other fruit will readily be directed automatically down a single chute and be shunted transversely thereof so as to fall into appropriate receptacles, containing severally determinate sizes of apples. The device operates positively, efficiently and can be manufactured at a relatively small cost.

Numerous modifications may be resorted to in practice without departing in principle from the details of construction herein disclosed.

What I desire to protect by Letters Patent is:—

1. In a device as described, in combination, a longitudinally inclined member providing a support upon which units of fruit may roll, said support being formed with a consecutive series of openings of a gradually increasing size from the upper toward the lower end of the support, a laterally-disposed series of receptacles, arranged adjacent the several openings, and a series of guide members adapted to direct units of fruit in a plane at right angles to the longitudinal axis of said support, through said openings into said receptacles.

2. In a device as described, in combination, a longitudinally inclined chute, a series of receptacles arranged laterally thereof and also at its end adjacent its lowest point, said chute being provided with baffle members adapted to shunt the movement of units of fruit on said chute transversely of said chute, and means whereby said units of fruit may automatically drop from said chute alongside said baffle members into said receptacles.

3. In a device as described, in combination, a downwardly-inclined chute, a feed device secured at its highest point, a series of receptacles arranged laterally of said chute and projecting therebeneath, inclined portions carried by said chute adapted to deflect units of fruit transversely of said chute, said chute having openings formed upon its side walls through which the deflected units of fruit are adapted to pass.

4. In a device as described, in combination, a longitudinally-extending chute, a hopper associated with the upper end of the chute, means for supporting the upper end of the chute so as to cause it to incline downwardly, means for guiding a continuous movement of units of fruit down the incline of said chute, means for shunting the course of movement of said units of fruit transversely of said chute at determinate points of the length of said chute, said chute being provided with a series of openings through which the shunted units of fruit are adapted to pass, guides for directing said shunted units of fruit toward said openings, and receptacles into which the discharged units of fruit ultimately fall.

5. In a device as described, in combination, a longitudinally extending chute, means for supporting the upper end of the chute relatively to the lower portion and in a higher plane, said chute being formed with a longitudinally-separated series of openings, a series of inclines extending in said chute so as to direct units of fruit into the several openings, said inclines forming a single directing member longitudinally of said chute, and receptacles into which said units of fruit empty.

6. In a device as described, in combination, a longitudinally-extending chute, means for disposing said chute in inclined relation with respect to the horizontal, a hopper feeding units of fruit into the upper end of the chute, said chute being formed with longitudinally-separated openings, the openings gradually becoming larger from the high toward the low end of said chute, and means for automatically and successively guiding units of fruit down the chute into the several openings.

In witness whereof I have hereunto set my hand and affixed my seal this 7th day of June, 1919.

EVAN R. SCOTT. [L. S.]

Attested:
WILLIAM E. BAFF,
ARTHUR B. BRADISH.